Feb. 22, 1949.   S. SCHNEIDER   2,462,561
WELDING APPARATUS
Filed Sept. 8, 1947   3 Sheets-Sheet 3

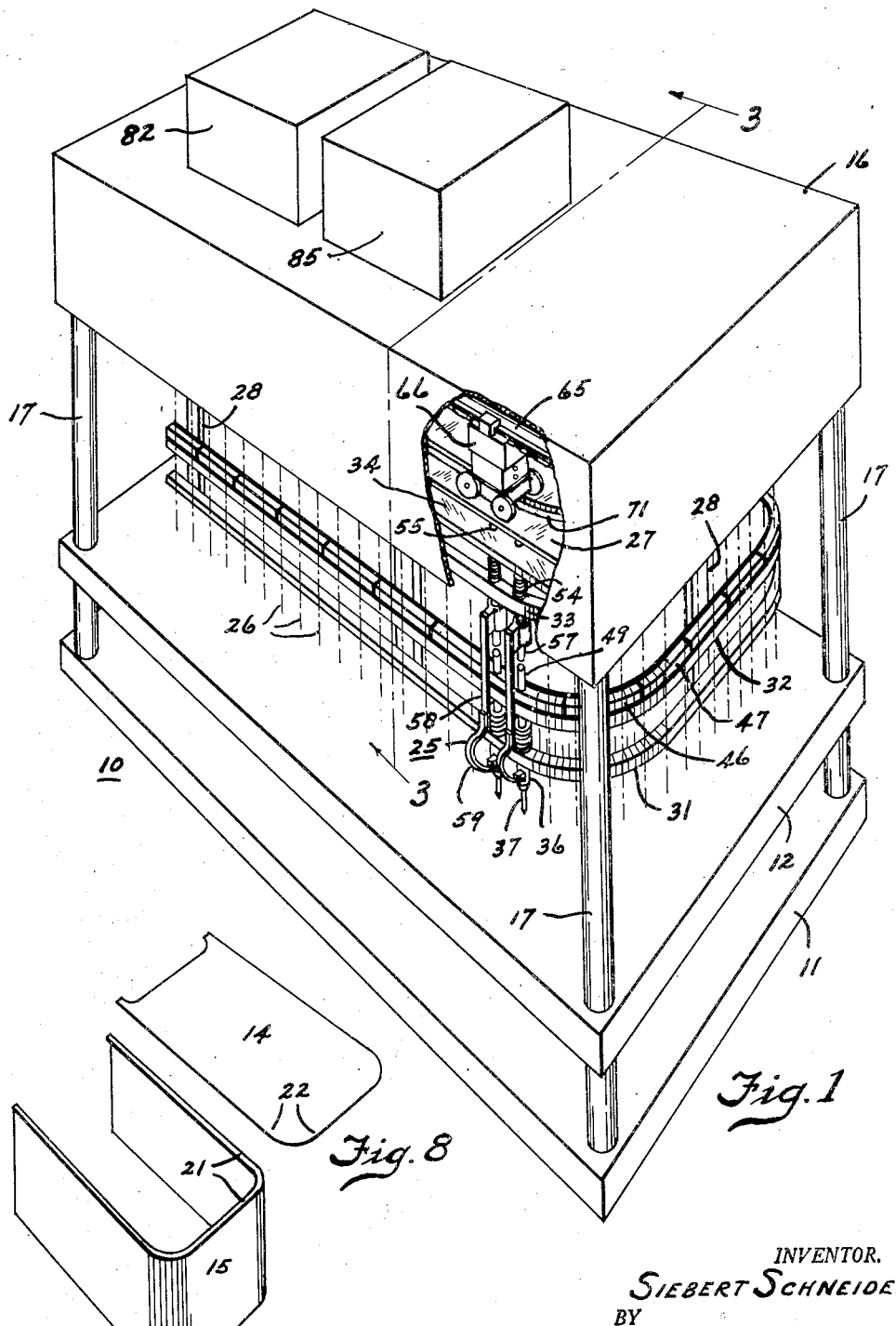

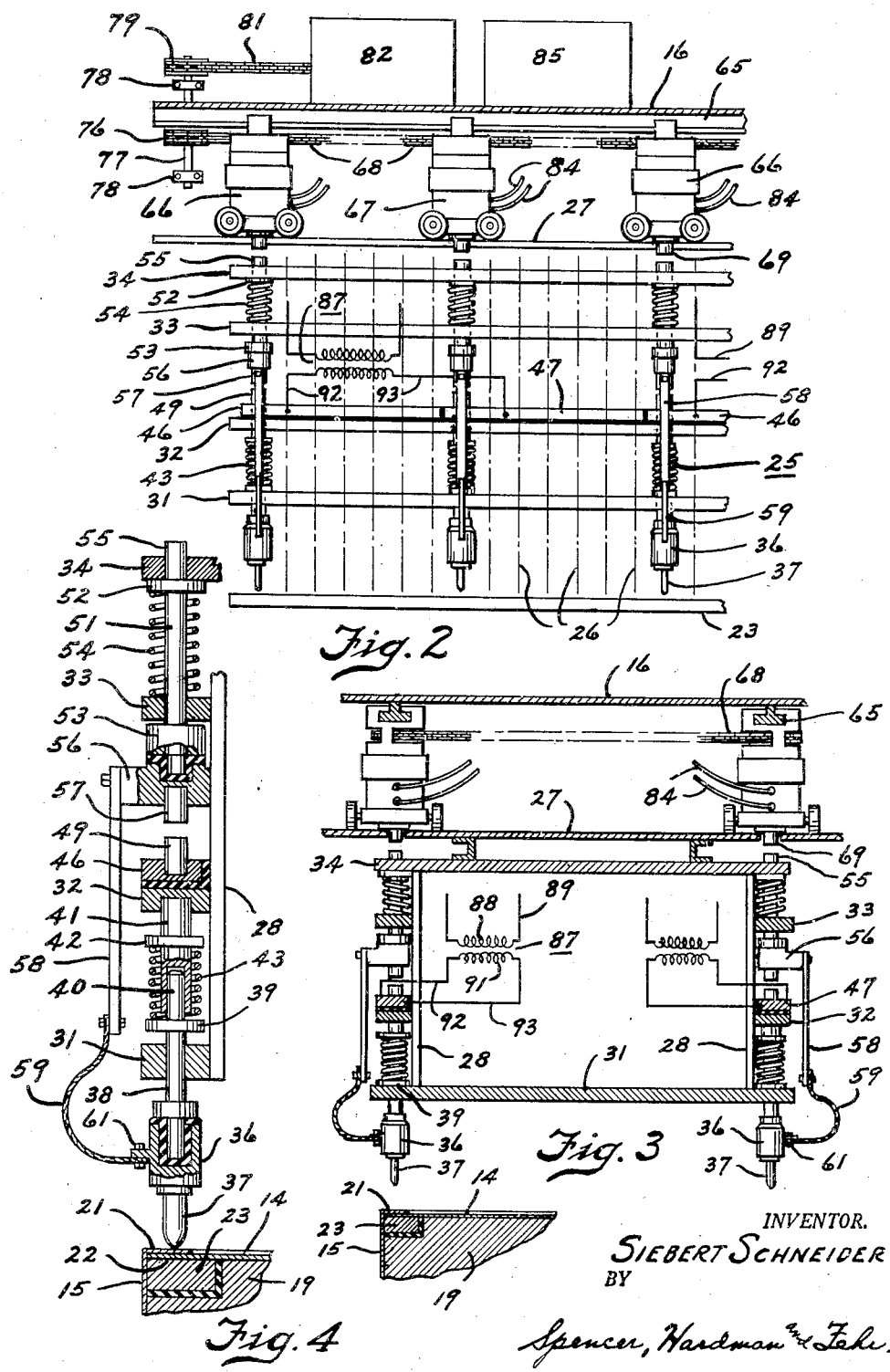

INVENTOR.
SIEBERT SCHNEIDER.
BY
Spencer, Hardman & Fehr

Patented Feb. 22, 1949

2,462,561

UNITED STATES PATENT OFFICE 2,462,561

WELDING APPARATUS

Siebert Schneider, Oakwood, Ohio, assignor to General Motors Corporation, Dayton, Ohio, a corporation of Delaware Application September 8, 1947, Serial No. 772,704

10 Claims. (Cl. 219—4)

This invention relates to welding apparatus and particularly to gang or multi-spot welding machines.

An object of my invention is to provide a multi-spot welding machine of high speed and increased efficiency while at the same time improving the quality of welds performed on an article by the machine.

Another object of my invention is to provide a multi-spot welding machine with a distributor that is in line with and can be moved or directed around a plurality of electrodes stationed at equally spaced apart points along a curved or winding path in order to carry out a curved line of a series of welds on articles of various curved shapes and contours.

A further object of my invention is to provide in a welding machine comprising a curved or winding single column of electrodes an improved segmental bus bar arrangement for the secondary or welding circuit of a transformer whereby all the loops of the secondary circuit will be equal in proportion both as to length and current flow capacity to insure spot-welds about the curved or winding path of arrangement of the column of electrodes of uniform intensity and quality.

A still further object of my invention is to provide a multi-spot welding machine with a transformer secondary or welding circuit which comprises a segmental bus bar extending substantially in parallel relation to a curved or winding single column of electrodes and to break up or divide the column of electrodes into groups, a first group of which cooperates with and are fired in sequence from one of matched or paired segments of the bus bar while a second group of electrodes cooperate with and are also fired in sequence from another of the paired segments simultaneously with the sequential firing of the electrodes of the first group thereof.

In carrying out the foregoing objects it is a further and more specific object of my invention to cause simultaneous energization and deenergization of one electrode of each group of a column of electrodes through paired or matched curved segments of a segmental bus bar sequentially throughout the length of the column whereby each electrode makes one of a series of welds through secondary circuits or loops of identical length and current flow capacity.

Further objects and advantages of the present invention will be apparent from the following description, reference being had to the accompanying drawings, wherein a preferred form of the present invention is clearly shown.

In the drawings:

Fig. 1 is an abbreviated perspective view, partly broken away, illustrating the type of welding machine in which the present invention is embodied;

Fig. 2 is a view showing the relation of welding guns on the machine shown in Fig. 1, to bus bars forming portions of a transformer secondary circuit;

Fig. 3 is a sectional view taken on the line 3—3 of Fig. 1, illustrating one method of supporting various elements of the welding machine;

Fig. 4 is an enlarged fragmentary sectional view showing the construction of one of the welding guns employed in the machine shown in Fig. 1;

Fig. 8 is a perspective view of a refrigerator cabinet back panel adapted to be welded to a substantially U-shaped outer cabinet shell by the present machine; and Fig. 9 is a perspective view of the outer refrigerator cabinet shell adapted to be placed in the present welding machine to be welded thereby to the cabinet back panel.

The present invention specifically relates to spot welding machines wherein a plurality of welding guns or at least their electrode tips are constructed and arranged to remain in point-pressure contact with the pieces of material to be welded together, not only before and after energizing and deenergizing of any one or more of the electrodes but, preferably throughout the entire period during which a series or multiplicity of spot-welds are made. In this type of welding machine the metal pieces are placed in a suitable fixture and clamped into assembled relation to one another upon a pressure pad. This fixture and the pressure pad are carried upon a movable table of the machine and the table, pressure pad and fixture, with the pieces to be welded clamped therein, is elevated as a unit so as to bring the plurality of electrodes into pressure contact with the portions of the pieces to be welded to one another. This function is embodied in present-day multi-spot welding machines and for this reason structure for carrying out that function has been omitted from the present disclosure.

Figure 7:
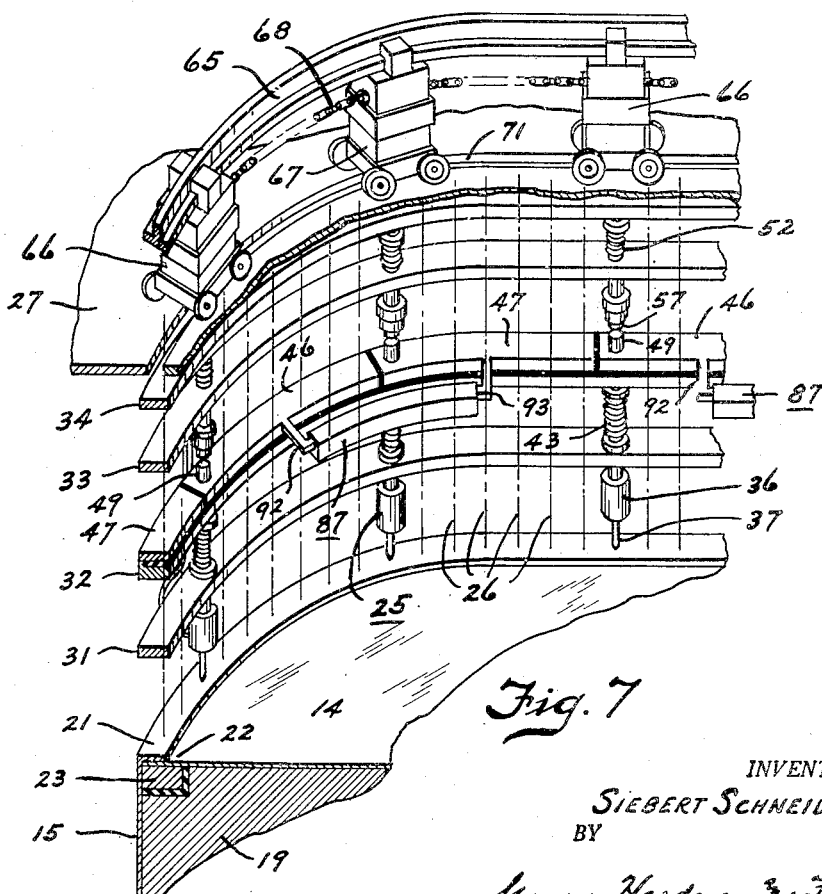
Fig. 7 is an exploded diagrammatic view showing the arrangement of groups of a column of welding guns stationed about a curve and cooperating with paired segments of a segmental bus bar.

Referring now to the drawings wherein Fig. 1 represents a multi-spot welding machine, generally represented by the reference character 10, including a stationary base portion 11, a movable table or the like 12, adapted to carry thereon a pressure pad and a fixture having metal parts or pieces, such as a flat refrigerator cabinet back panel 14, shown in Fig. 8 and a refrigerator cabinet outer substantially U-shaped shell 15, shown in Fig. 9, clamped therein, an upper part 16 and uprights or supporting posts 17. The cabinet shell 15 is provided with an inturned flange 21 against which edge portions 22 of back panel 14 are clamped in the fixture. The pressure pad 19 (see Figs. 3, 4 and 7) includes a bar or conductor 23 disposed in vertical alignment with and beneath the portion of the clamped together cabinet parts to be welded. The fixture is, in the present disclosure, essentially U-shaped in configuration and therefore welding guns generally represented in Fig. 1 by the reference character 25, are stationed or positioned at horizontally equal spaced apart points along the curved or winding path of configuration of the cabinet shell as well as along the straight legs of the U to provide a single column of guns. A gun 25 is stationed at each of the positions on the machine indicated by the dot-dash lines 26. This provides a continuous column of ninety-six welding guns 25 on the machine 10 and this column is broken up or divided into groups of guns, each group of which, in the present disclosure, includes six such guns, for a purpose to be hereinafter described. While I have disclosed the guns 25 as being stationed in single file relation to one another throughout the column thereof, it is to be understood that the guns may, if desired, be stationed in staggered or offset relation to one another.

The plurality or single column of welding guns 25 are supported from the upper part 16 of machine 10 by suitable supports suspended from a stationary plate 27 mounted on the posts 17. The gun supporting structure includes vertical members 28 (see Figs. 3 and 4) having horizontally disposed members 31, 32, 33 and 34 carried thereby and extending continuously about and above the U-shaped article to be welded. Each gun 25, located at the dot-dash lines 26, includes an electrode point or tip holder 36 having an electrode welding tip 37 secured thereto in any suitable or conventional manner. Each holder 36 is insulated from and carried by the bottom end of a shaft 38 passing through the lower support member 31. Shaft 38 is provided with an integral collar 39, normally bearing against the member 31 (see Fig. 3), and has its upper end 40 extended into a bore provided in a stub shaft 41 (see Fig. 4). The upper end of stub shaft 41 is secured in a suitable bore provided in support member 32 and has an integral collar 42 formed thereon. The slide fit of the upper end of shaft 38 within the bore of stub shaft 41, permits movement of shaft 38 relative to or into shaft 41 against the tension of a spring 43 surrounding the lower portion of stub shaft 41 and disposed between the collars 39 and 42 as will hereinafter be described. Support member 32 carries and has suitably insulated therefrom a segmental bus bar comprising a plurality of matched or paired segments 46 and 47 arranged in alignment with the work to be placed in the machine and some of which are curved to extend about the work in parallel relation with the welding guns 25 at the points to be spot-welded. Thus the segmental bus bar comprises a train of segments 46 and 47 which extend horizontally along the curved or winding column of guns 25 arranged about the U-shape of the refrigerator cabinet parts to be welded together. Each segment 46 and 47 is provided with a contact stud 49 (see Fig. 4) located at the position of each gun 25. The upper portion of each welding gun comprises a shaft 51 extending through the support member 33 and provided with fixed upper and lower enlargements 52 and 53 respectively. A spring 54 surrounds shaft 51 and is disposed between the support member 33 and the upper enlargement 52 on shaft 51 (see Fig. 4). Upper end 55 of shaft 51 projects through a suitable opening provided in member 34 for a purpose to be presently described. The lower end of shaft 51, below the enlargement 53, carries a block 56 (see Fig. 4). Block 56 is suitably insulated from shaft 51 and has a contact 57 projecting therefrom for engagement with the contact 49. This block 56 also carries a down bus or post 58 having a flexible cable or shunt 59 attached thereto. The lower end of cable or shunt 59 is attached, as at 61, to the electrode tip holder 36.

A guide or track 65 extends horizontally in parallel relationship to the curved column of guns 25 and the curved arrangement of the segments 46 and 47 of the segmental bus bar. A distributor device associated with and guidable along or by guide 65 comprises a plurality of pairs of elements 66 and 67 horizontally spaced from one another by a chain or the like 68 which is flexible in one direction to permit its movement about the curved formation of the column of guns 25. The chain 68 may be clamped to each of the elements 66 and 67 by any suitable or desirable clamping arrangement to maintain the elements a predetermined equal distance from one another. Each of the elements 66 and 67 may be in the form of an air or pneumatic cylinder mounted on a carriage, provided with rollers, for horizontal movement along the plate 27. Each element 66 and 67 is provided with a vertically movable button or projection 69 (see Figs. 5 and 6) which may be extended downwardly through a slot 71 (see Fig. 7) provided in plate 27. Projections or buttons 69 are adapted to engage the ends 55 of shafts 51 of the guns 25 for a purpose to be presently described. It being understood that there is one element 66 provided for association with each set of the groups of six welding guns 25 and one element 67 provided for the other set of the groups of the column of guns. The chain 68 which connects all of the elements 66 and 67 together in predetermined spaced relation to one another is continuous and is looped about a ratchet wheel 76 (see Fig. 2) mounted on a shaft 77 supported in any suitable manner, such as by upper and lower bearings indicated at 78. The upper end of shaft 77 also has a ratchet wheel or gear 79 mounted thereon and this ratchet 79 is connected by a chain or the like 81 with a driving mechanism (not shown) and which may be housed in a housing 82. The driving mechanism within housing 82 may be a Geneva drive or a pneumatic ratchet drive as is common or conventional in the art.

While I have illustrated the so-called distributor comprising, the chain 68 and air cylinder, it is to be understood that other various forms of distributors or devices may, if desired, be employed to travel around the curvature of the welding gun arrangement.

Air may be supplied to each of the plurality of air cylinder elements 66 and 67 simultaneously through conduit connections 84 under the control of suitable solenoid mechanisms synchronized with the chain drive mechanism. This solenoid mechanism may be operated electrically in response to operation of an electrical control also synchronized with the chain drive mechanism and which control may be employed to close and open switches of the primary circuit of a plurality of transformers associated with the welding machine 10. The solenoid mechanism and the electric control for a welding machine of the type disclosed is conventional and well known to those skilled in the art and therefore such mechanisms have not been herein illustrated but may be housed within a control box generally represented by the reference character 85. The connection of the carriages or the air cylinder housings 66 and 67 with the track or guide 65, while being shown merely as a sliding connection, may be of any suitable form and construction as is conventional in the art, and which connection may be made by roller or other forms of bearings.

Each group of six welding guns 25 associated with the segments 46 and 47 is adapted to be connected with their respective paired or matched segments to provide conductors or secondary loops of equal length and uniform current flow capacity through all the guns to be connected in the secondary circuit of any one of a plurality of transformers. A transformer 87 for each group of guns 25 includes a primary or main winding indicated diagrammatically at 88 (see Fig. 3) and a primary or main circuit 89. Each transformer 87 also includes a secondary winding indicated at 91, a secondary or welding circuit, a portion of which comprises the leads 92 and 93 and which may be in the form of bar portions extending from the segments 46 and 47 (see Fig. 7), the segments 46 and 47 themselves, contacts 49 and 57 when closed, block 56, conductor 58, shunt cable 59, holder 36, electrode tip or point 37, the portions 21 and 22 of the article to be welded and bus bar conductor 23. The remainder or other portion of this secondary circuit leads from bar conductor 23 back to the other side of the transformer secondary winding 91 through a gun of the adjacent group of guns 25 which has its contacts 49 and 57 closed. A pressure or the like switch diagrammatically indicated at 95 (see Figs. 5 and 6) is interposed in the main circuit 89 of each transformer 87.

As before stated the refrigerator cabinet parts 14 and 15 are placed in a fixture, carried upon table 12 of machine 10, and clamped to one another by the fixture so that edge portions 22 of back plate 14 abuts against the conductor 23 with the flange 21 on the shell 15 overlying the edge portion 22 of plate 14 (see Fig. 3). The table is slowly elevated by a suitable power device (not shown) so as to bring the parts in the fixture and on the pressure pad into contact with the plurality of electrode points or tips 37 of guns 25 (see Figs. 4 and 7). Electrode tips or points 37 are raised slightly against the tension of springs 43 on the guns 25 to provide pressure contact of all of the electrodes with the parts to be welded together. This readies the welding machine 10 for operation to carry out a series of spot-welds at all points at which the electrodes contact the parts to be welded together, it being understood that each electrode 37 of the plurality of electrodes on machine 10 makes only one spot-weld of a plurality or series of welds to be completed. It is also to be understood that in the present welding machine two guns 25, one in each group of the column thereof are simultaneously and sequentially placed in contact with the segments 46 and 47, or are simultaneously and sequentially connected in the secondary transformer circuit and fire in series with each transformer 87 at each welding position so that any even number of welds can be made in a single column of guns of any desired length and curvature arrangement. It is also to be noted that the chain 68 extends continuously around the U-shaped arrangement of the column of welding guns 25 and is driven along the guide 65 through the length of six guns comprising one group of each of the plurality of groups thereof by its connection with the sprocket drive wheel 76 located at the ends of the legs of the U-shaped gun column. Thus after the machine 10 has been readied as described, an electric circuit leading thereto is closed to actuate the solenoid air control, the electric circuit control mechanism or mechanisms indicated at 85 and the chain drive mechanism 82. These mechanisms are each synchronized one with the other to perform the desired result at the right time as is common practice in this art.

Figure 5:
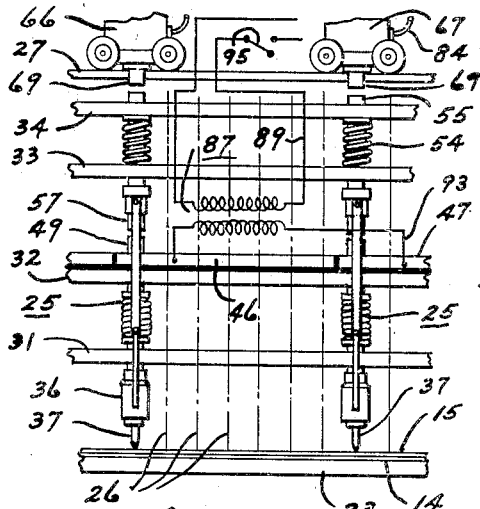
Fig. 5 is a view illustrating one welding gun of two groups thereof out of contact with a transformer secondary circuit.
Figure 6:
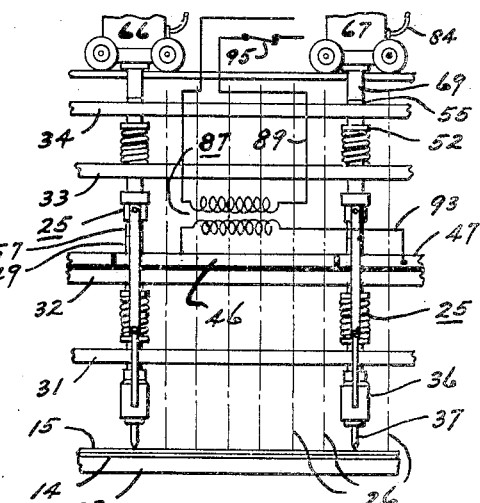
Fig. 6 is a view similar to Fig. 5 and illustrates the one welding gun of the two groups thereof in contact with the transformer secondary circuit.

In Fig. 5 of the drawings I have shown the element 66 positioned over a gun 25 of one group and element 67 over a gun 25 of another group, with the switch 95 of the primary transformer circuit open, with the buttons 69 spaced from the ends 55 of shafts 51 and with the secondary contacts 49 and 57 also open. Air is directed to all of the plurality of air cylinders 66 and 67, through the conduits 84, and the air pressure causes the projections 69 on the air cylinder carriages to alternately move outwardly and inwardly of the carriage or housings as the elements 66 and 67 are indexed from one pair of guns 25 to another. Projections 69 move down and engage the ends 55 of shafts 51 of the guns 25, with which the air cylinders are in alignment, throughout the column of welding guns. The air force applied to the projections 69 and to shafts 51 overcomes the tension of springs 54 and moves the shafts 51 downwardly to thereby move the blocks 56 downwardly and consequently contacts 57 secured thereto into engagement with the contacts 49 carried by the bus bar segments 46 and 47 (see Fig. 6). Thereafter the control or switches 95 for the main circuits 89 of the transformer 87 closes and causes the transformers 87 to become effective to energize their secondary circuits (see Fig. 6). Current now flows from one segment 46 of each pair thereof in the segmental bus bar through contacts 49 and 57 to one electrode 37 of guns 25 and to conductor 23 whereby a spot-weld is made on the parts to be welded. The flow of current continues on through conductor 23 to an electrode of a gun 25 in the adjacent group thereof having had its contacts 49 and 57 simultaneously closed with the closing of the first mentioned contacts 49 and 57 of the said one electrode back to the transformer whereby a second spot-weld is made with the first spot-weld in the plurality of groups of guns arranged in the column about the machine. The switches 95 of the transformer main circuits 89 are then opened to deenergize the transformers and thereafter air pressure to the elements 66 and 67 is directed in the opposite direction to cause the cylinders in these elements to return the projecting buttons 69 to their normal or withdrawn position as shown in Fig. 5 of the drawings. The indexing mechanism 82, Geneva or whatever drive it may be, continues to operate and indexes the elements 66 and 67 simultaneously on to the next station or to the next gun 25 of each group thereof throughout the plurality of groups of guns in the single column thereof. In so doing it is to be understood that chain 81 causes sprocket 79, shaft 77 and sprocket wheel 76 to rotate the chain about the machine 10 along and guided by guide 65 through the curved or winding arrangement of the column of welding guns. As the indexing mechanism 82 moves or indexes the elements 66 and 67 simultaneously from one station to another or from one welding gun to another in sequence throughout the length of the column of guns the control mechanism of machine 10 automatically directs air to the elements 66 and 67 in alternate directions to reciprocate the buttons 69. The transformer main circuits are also automatically closed and opened to energize or deenergize the electrodes 37 during a portion of the time the welding guns 25 are placed in the transformer secondary circuits or during a portion of the time the gun contacts 49 and 57 are closed. The transformer main circuit may, if desired, be controlled by a timer operated by a pressure switch having a connection with the mechanism which alternately reverses the flow of air to the elements 66 and 67. After the elements 66 and 67 have each traveled the length of six guns 25 and caused sequential firing of each of the six electrodes in each of the groups thereof, the indexing device 82 is automatically stopped with the elements 66 and 67 positioned above the sixth gun of each group in the column thereof. Upon again initiating the welding procedure the indexing device reverses itself to cause the chain 68 to move in the opposite direction for reversing the order in which the welding guns are fired. That is, instead of firing the guns located in the number one position and sequentially in a direction toward the guns located in the number six position they will be fired in sequence from the number six position toward the number one position.

From the foregoing it will be apparent that I have provided an improved high speed multi-spot welding machine in which a large quantity of welding guns, stationed in a curved column, can be fired sequentially in rapid succession and in which each individual electrode makes but one of a series of uniform welds. In my improved machine the secondary loop from the transformer to each electrode of each group of electrodes that are fired simultaneously with one another and in sequence is small and of identical length, thus greatly reducing costly secondary losses and eliminating troublesome disparities of current delivery to welding tips and eliminating burning one spot with excessive current in order to provide a more distant one, particularly along a curve, with current sufficient for a satisfactory spot weld. By making the secondary loops of uniform length and current flow capacity a more efficient and equal distribution of the welding current is obtained. The high speed possible with a machine of the type disclosed lowers operating costs and affords high production. Since each transformer makes a plurality of welds, by virtue of the great number of electrodes to be connected to the transformer by way of the matched or paired bus bar segments arranged closely in line with the work, relatively few transformers of low capacity are required. The simplicity of the machine together with the fact that movement of the current conducting parts thereof is small, results in low maintenance costs.

While the form of embodiment of the invention as herein disclosed, constitutes a preferred form, it is to be understood that other forms might be adopted, as may come within the scope of the claims which follow.

What is claimed is as follows:

1. In an electric welding machine, the combination of a single column of electrodes stationed in spaced relation to one another and arranged in a path of predetermined configuration, a transformer having a main circuit connected thereto and a secondary circuit, a portion of said secondary circuit including a bus bar comprising segments extending in the direction of said path of predetermined configuration of said single column of electrodes, a first segment of said bus bar being insulated from a second segment thereof, said single column of electrodes being normally out of connection with said bus bar segments and divided into groups, the electrodes of one group being adapted for connection to said first segment and the electrodes of another group thereof being adapted for connection to said second segment, a guide extending parallel to the direction of said path of said single column of electrodes, a pair of elements associated with said guide and spaced a predetermined distance from one another therealong, means for moving said elements in unison along said guide and for connecting an electrode of each of said groups thereof with its respective bus bar segment sequentially throughout the length of said single column of electrodes, and means for causing energization and deenergization of the electrodes during a portion of their connection with said bus bar segments whereby each individual electrode of said single column thereof makes one of a series of welds.

2. In an electric welding machine, the combination of a plurality of electrodes stationed one after the other in equal horizontally spaced apart relation to provide a single column thereof extending in a predetermined path, a transformer having a main circuit connected thereto and a secondary circuit, a portion of said secondary circuit including a bus bar comprising a pair of segments extending in the direction of said path of predetermined configuration of said single column of electrodes, one of said pair of segments of said bus bar being insulated from the other of said pair of segments thereof, said single horizontal column of electrodes being normally out of connection with said bus bar segments and divided into groups, the electrodes of one group being adapted for connection to said one segment and the electrodes of another group thereof being adapted for connection to said other segment, a guide extending parallel to the horizontal direction of said path of said single column of electrodes, a device associated with said guide including elements horizontally spaced apart a predetermined distance, mechanism for moving said elements in unison along said guide and for connecting an electrode of each of said groups thereof with its respective bus bar segment sequentially throughout the length of said single column of electrodes, and means synchronized with said driving mechanism for causing energization and deenergization of the electrodes during a portion of their connection with said bus bar segments whereby each individual electrode of said single column thereof makes one of a series of welds.

3. In a multiple electric spot welding machine of the type wherein a plurality of individual electrodes are held in pressure engagement with portions of an article to be welded before and after current is directed through the electrodes, the combination of a plurality of spaced apart electrodes stationed in a curved column, a transformer having a main circuit and having a part of its secondary circuit formed by a bus bar comprising a pair of segments insulated from one another, said segmental bus bar extending substantially in parallel relation to said curved column of electrodes, said column of electrodes being normally out of connection with said bus bar segments and being divided into groups, the electrodes of one group being adapted for connection to one of said pair of segments and the electrodes of another group thereof being adapted for connection to the other of said pair of segments, a guide extending in parallel relationship with said curved column of electrodes, a pair of elements spaced apart a predetermined distance and adapted to be directed in unison along said guide for connecting an electrode of each of said groups thereof with its respective bus bar segment and for breaking said connection sequentially throughout the length of said column of electrodes, and means for causing energization and deenergization of the electrodes during a portion of their connection with said bus bar segments whereby each individual electrode of said column thereof makes one of a series of welds.

4. In a multiple electric spot welding machine of the type wherein a plurality of individual electrodes are held in pressure engagement with portions of an article to be welded before and after current is directed through the electrodes, the combination of a plurality of spaced apart electrodes arranged in a curved column, a transformer having a main circuit and a secondary circuit, said curved column of electrodes being divided into groups, a guide extending in parallel relationship with said curved column of electrodes, a pair of elements spaced apart a predetermined distance and adapted to be directed in unison along said guide, means for moving said spaced apart elements in unison along said guide, said elements being rendered effective upon movement thereof along said guide for connecting an electrode of each of said groups thereof into said secondary circuit and for breaking said connection sequentially throughout the length of said column of electrodes, means for causing energization and deenergization of the electrodes during a portion of their connection in said secondary circuit whereby each individual electrode of said column thereof makes one of a series of welds, a portion of said secondary circuit being formed by a segmental bus bar comprising a first segment cooperating with the electrodes of one of said groups thereof and a second segment insulated from said first segment cooperating with the electrodes of another group thereof, and said first and said second segments being paired and arranged to extend substantially in parallel relation to said curved column of electrodes and to provide a conductor of equal length and uniform current flow capacity from said transformer through each electrode in said column thereof.

5. In a multiple electric spot welding machine of the type wherein a plurality of individual electrodes are held in pressure engagement with portions of an article to be welded before and after current is directed through the electrodes, the combination of a plurality of electrodes stationed at equally spaced apart points and arranged in a curved horizontal column, a transformer having a main circuit and a secondary circuit, said curved column of electrodes being divided into groups, a guide extending horizontally in parallel relationship with said curved column of electrodes, a device associated with said guide including a plurality of elements horizontally spaced apart a predetermined distance therealong, said device being flexible to permit said elements to be moved about said curved column of electrodes, driving mechanism for moving said device along said guide to cause the elements thereof to travel in unison, said elements being rendered effective upon movement of said device along said guide to connect an electrode of each group of said groups thereof into said secondary circuit and to break said connections sequentially throughout the length of said column of electrodes, mechanism synchronized with said driving mechanism for causing energization and deenergization of the electrodes during a portion of their connection in said secondary circuit whereby each individual electrode makes one of a series of welds, a portion of said secondary circuit being formed by a segmental bus bar comprising a first segment cooperating with all of the electrodes of one of said groups thereof and a second segment insulated from said first segment cooperating with all of the electrodes of another group thereof, and said first and said second segments being paired and arranged to extend horizontally in substantially parallel relationship with said curved column of electrodes to provide a conductor of equal length and uniform current flow capacity from said transformer through each electrode in said column thereof.

6. In a multiple electric spot welding machine of the type wherein a plurality of individual electrodes are held in pressure engagement with portions of an article to be welded before and after current is directed through the electrodes, the combination of a plurality of equally spaced apart electrodes positioned one after the other in a curved column, said curved column of electrodes being divided into groups, a transformer having a main circuit and a secondary circuit, a guide extending in parallel relationship to said curved column of electrodes, a pair of elements mounted on said guide and each comprising means adapted to connect said electrodes into said transformer secondary circuit, a chain connecting said elements a predetermined distance apart, means for driving said chain to move said elements in unison along said guide, the means of said elements being rendered effective upon movement thereof for connecting an electrode of each of said groups thereof into said secondary circuit and for breaking said connection sequentially throughout the length of said curved column of electrodes, and means for causing energization and deenergization of the electrodes during a portion of their connection in said secondary circuit whereby each individual electrode of said column thereof makes one of a series of welds.

7. In a multiple electric spot welding machine of the type wherein a plurality of individual electrodes are held in pressure engagement with portions of an article to be welded before and after current is directed through the electrodes, the combination of a plurality of equally spaced apart electrodes positioned one after the other in a curved column, said curved column of electrodes being divided into groups, a transformer having a main circuit and a secondary circuit, a guide extending in parallel relationship to said curved column of electrodes, a pair of elements mounted on said guide and each comprising means adapted to connect said electrodes into said transformer secondary circuit, a chain connecting said elements a predetermined distance apart, means for driving said chain to move said elements in unison along said guide, the means of said elements being rendered effective upon movement thereof for connecting an electrode of each of said groups thereof into said secondary circuit and for breaking said connection sequentially throughout the length of said curved column of electrodes, means for causing energization and deenergization of the electrodes during a portion of their connection in said secondary circuit whereby each individual electrode of said column thereof makes one of a series of welds, a portion of said secondary circuit being formed by a segmental bus bar comprising a first segment cooperating with all the electrodes of one group thereof and a second segment cooperating with all of the electrodes of another group thereof, and said segments being paired and arranged to extend substantially in parallel relation to said curved column of electrodes to provide a conductor of equal length and uniform current flow capacity from said transformer through each electrode in said column thereof.

8. In a multiple electric spot welding machine of the type wherein a plurality of individual electrodes are held in pressure engagement with portions of an article to be welded before and after current is directed through the electrodes, the combination of a plurality of vertically disposed equally spaced apart electrodes arranged one after the other in a horizontally extended winding column, a transformer having a main circuit and having a part of its secondary circuit formed by a segmental bus bar comprising a pair of segments insulated from one another, said segmental bus bar extending substantially in parallel relationship to said winding column of electrodes, said column of electrodes being normally out of connection with said bus bar segments and being divided into groups, all the electrodes of one group being adapted for connection to one of said pair of segments and all the electrodes of another group thereof being adapted to contact the other of said pair of segments, a guide above said electrodes extending horizontally in parallel relationship to said winding column of electrodes, a pair of elements associated with said guide, each element of said pair thereof comprising a portion adapted to connect said electrodes with said bus bar segments, a chain connecting said elements in predetermined horizontally spaced apart relation to one another, means for driving said chain throughout the length of one of said groups of electrodes for moving said elements in unison along said guide, said portion of said elements being rendered effective upon movement of the elements to connect an electrode of each of said groups thereof with its respective bus bar segment and for breaking said connection sequentially throughout the length of said winding column of electrodes, and means for causing energization and deenergization of the electrodes during a portion of their connection with said bus bar segments whereby each individual electrode of said column thereof makes one of a series of welds.

9. In an electric welding machine, the combination of a column of electrodes stationed in spaced apart relation relative to one another, a transformer having a main circuit connected thereto and a secondary circuit, a portion of said secondary circuit including a bus bar comprising a train of segments insulated one from another and extending in parallel relation to said column of electrodes, said column of electrodes being normally out of connection with said bus bar segments and divided into groups, the electrodes of one group being adapted for connection to one segment of said train thereof and the electrodes of another group being adapted for connection to a segment other than said one segment, movable elements adapted to cooperate with said stationed electrodes and being spaced apart a predetermined distance along said column thereof, means for moving said elements in unison along a line paralleling said column of electrodes and for connecting an electrode of each of said groups thereof with its respective bus bar segment sequentially along said groups and throughout the length of said column of electrodes, and means for causing energization and deenergization of the electrodes during a portion of their connection with said bus bar segments whereby each individual electrode of said column thereof makes one of a series of welds.

10. In an electric welding machine, the combination of a column of electrodes stationed in spaced apart relation relative to one another, a transformer having a main circuit connected thereto and a secondary circuit, a portion of said secondary circuit including a bus bar comprising a train of segments insulated one from another and extending in parallel relation to said column of electrodes, said column of electrodes being normally out of connection with said bus bar segments and divided into groups, the electrodes of one group being adapted for connection to one segment of said train thereof and the electrodes of another group being adapted for connection to a segment other than said one segment, means cooperating with said stationed electrodes for connecting an electrode of each of said groups thereof with its respective bus bar segment sequentially along said groups and throughout the length of said column of electrodes, means for causing energization and deenergization of the electrodes during a portion of their connection with said bus bar segments whereby each individual electrode of said column thereof makes one of a series of welds, and said bus bars being matched as to length and conductive properties to provide a conductor of uniform current flow capacity from said transformer through each of said electrodes.

SIEBERT SCHNEIDER.

REFERENCES CITED

The following references are of record in the file of this patent:

UNITED STATES PATENTS

| Number | Name | Date |
|---|---|---|
| 2,286,945 | Andrews et al. | June 16, 1942 |
| 2,287,945 | Purat | June 30, 1942 |